(12) United States Patent
Tsirkin et al.

(10) Patent No.: US 9,858,101 B2
(45) Date of Patent: Jan. 2, 2018

(54) VIRTUAL MACHINE INPUT/OUTPUT THREAD MANAGEMENT

(71) Applicant: Red Hat Israel, Ltd., Ra'anana (IL)

(72) Inventors: Michael Tsirkin, Raanana (IL); Paolo Bonzini, Milan (IT)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

(21) Appl. No.: 14/540,497

(22) Filed: Nov. 13, 2014

(65) Prior Publication Data

US 2016/0139942 A1    May 19, 2016

(51) Int. Cl.
*G06F 9/455*    (2006.01)

(52) U.S. Cl.
CPC ............ *G06F 9/45558* (2013.01); *G06F 2009/45575* (2013.01); *G06F 2009/45579* (2013.01)

(58) Field of Classification Search
CPC ....... G06F 9/45558; G06F 2009/45575; G06F 2009/45579; G06F 2009/45583
See application file for complete search history.

(56) References Cited

U.S. PATENT DOCUMENTS

| | | | |
|---|---|---|---|
| 5,361,375 A * | 11/1994 | Ogi | G06F 9/45533 700/2 |
| 6,792,483 B2 * | 9/2004 | Schmidt | G06F 3/0601 710/260 |
| 8,566,492 B2 * | 10/2013 | Madukkarumukumana | G06F 13/24 710/260 |
| 9,317,453 B2 * | 4/2016 | Armstrong | G06F 9/45558 |
| 2003/0079067 A1 * | 4/2003 | Schmidt | G06F 3/0601 710/48 |
| 2009/0037907 A1 * | 2/2009 | Armstrong | G06F 12/1475 718/1 |
| 2016/0124762 A1 * | 5/2016 | Tsirkin | G06F 9/45545 718/1 |
| 2016/0139942 A1 * | 5/2016 | Tsirkin | G06F 9/45558 718/1 |
| 2016/0224362 A1 * | 8/2016 | Tsirkin | G06F 9/45558 |

* cited by examiner

*Primary Examiner* — Marina Lee
(74) *Attorney, Agent, or Firm* — Haynes and Boone, LLP

(57) ABSTRACT

A method performed by a physical computing system includes detecting an interrupt signal sent to a virtual processor being managed by the hypervisor, creating a map between the virtual processor and an Input/Output (I/O) thread associated with the interrupt signal, determining that the virtual processor is idle, finding the I/O thread associated with the idle virtual processor based on the map, and moving the I/O thread associated with the idle virtual processor up in a processing queue, the processing queue being for processes to be executed on a physical processor.

20 Claims, 6 Drawing Sheets

VIRTUAL MACHINE INPUT/OUTPUT THREAD MANAGEMENT

BACKGROUND

The present disclosure relates generally to virtual systems, and more particularly, to virtual processor management.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

A host machine (e.g., computer or server) is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

A host machine generally uses a scheduler to schedule tasks to be executed on the processors of the host machine. Such tasks can be on behalf of host machine, including Input/Output threads that process communication between the host machine and the virtual machine, or such tasks can include execution of the virtual processors for the virtual machines being hosted by the host machine. The scheduler will typically allocate periods of time to each of the virtual processors. But, sometimes a virtual processor of one of the virtual machines to which time is allotted is in a halt state. The virtual processor may be in a halt state until it receives an interrupt signal. The interrupt signal may indicate completion of an Input/Output thread. Thus, the performance of the virtual machine is reduced, as that time that could have been allotted to the virtual machine is dedicated to other tasks. Overall, the efficiency of the host is reduced.

SUMMARY

According to one example, a method performed by a physical computing system includes detecting an interrupt signal sent to a virtual processor being managed by the hypervisor, creating a map between the virtual processor and an Input/Output (I/O) thread associated with the interrupt signal, determining that the virtual processor is idle, finding the I/O thread associated with the idle virtual processor based on the map, and moving the I/O thread associated with the idle virtual processor up in a processing queue, the processing queue being for processes to be executed on a physical processor.

According to one example, a computing system includes a processor and a memory comprising computer readable instructions that when executed by the processor, cause the system to run a hypervisor to host a virtual machine, run a scheduler to manage a processing queue for execution of threads on the processor, detect an interrupt signal sent to the virtual processor, create a map between an Input/Output (I/O) thread associated with the interrupt signal and the virtual processor, determine that the virtual processor is in an idle state, use the map to find the I/O thread associated with the virtual processor in the idle state, and cause the scheduler to move the I/O thread up in the processing queue.

A method performed by a physical computing system includes, with a hypervisor, monitoring interrupt signals sent to virtual processors, creating a map between Input/Output (I/O) threads associated with the interrupt signals and the virtual processors, with a scheduler, managing a processing queue for a set of threads to be executed on a host processor, the set of threads including the I/O threads, determining that a first virtual processor of the virtual processors is in an idle state, using the map to find the I/O thread associated with the first virtual processor, and causing the scheduler to use execution time allocated to the first virtual processor for execution of the I/O thread associated with the first virtual processor.

Figure 1:
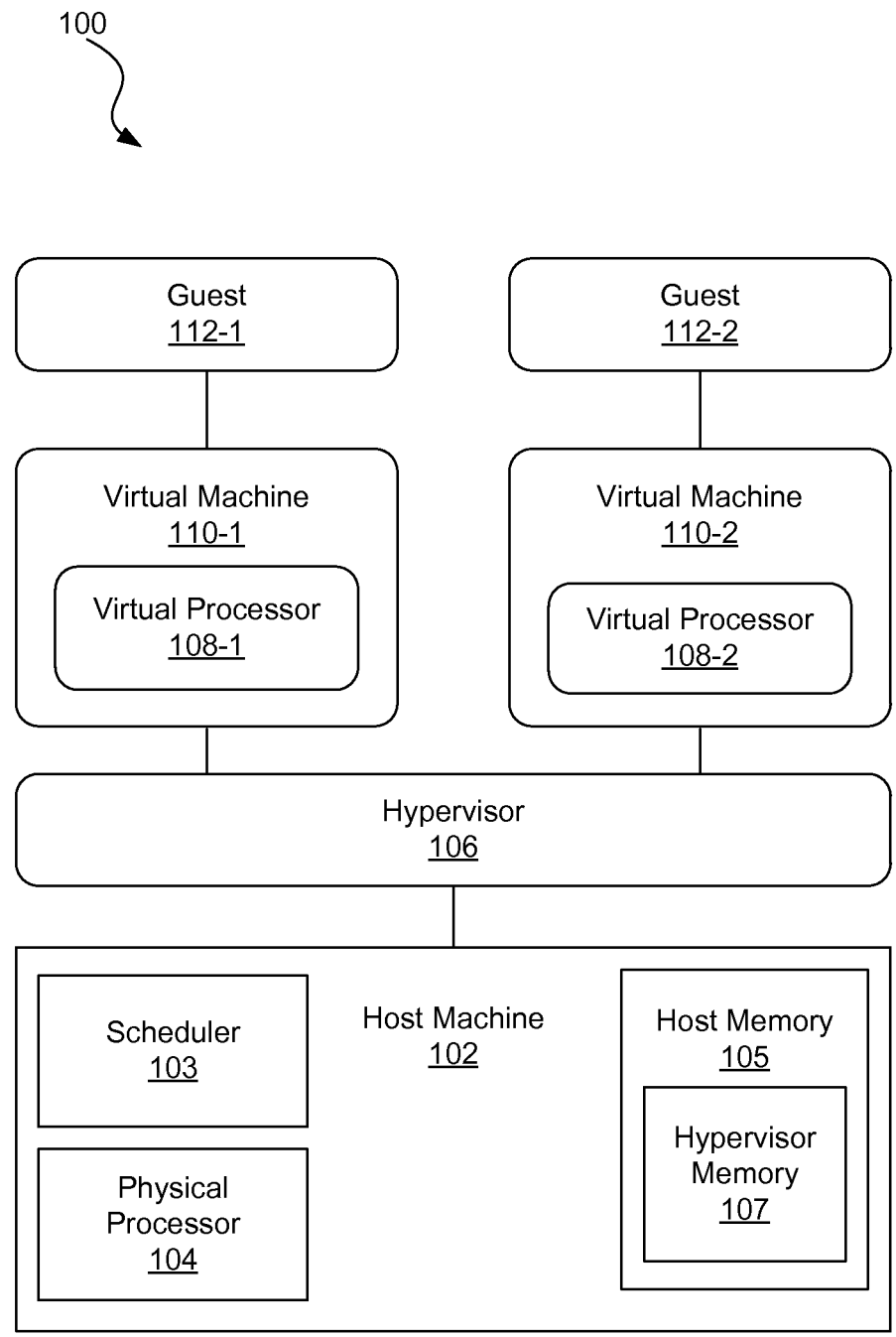
FIG. 1 is a diagram showing an illustrative host system running a plurality of virtual machines, each virtual machine including one or more virtual processors, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a scheduler allocates processing time to different virtual machines running on a host system, and further allocates processing time to different virtual processors within the virtual machine. During the allotted processing time for a particular virtual processor, that virtual processor may be in a halt state. Processors may enter a halt state for a variety of reasons. In one example, a processor enters a halt state until it receives an interrupt signal indicating completion of an I/O thread. I/O threads include input operations such as receiving data from a user input device. I/O threads also include output operations such as sending data to external device such as storage devices or network device. Because such operations can take substantially longer than the time it takes to execute instructions by the processor, the processor will generally execute other instructions that are not dependent upon completion of the I/O thread. The I/O thread will then make use of interrupt signals that let the processor know that data related to an I/O thread is available for its use. The processor can then make use of that data and execute further instructions until it needs additional data from the I/O thread. But, sometimes, there are no other tasks for a processor to perform and it must wait for completion of the I/O thread before proceeding. In such cases, the processor executes a halt command until an interrupt signal is received.

In the case of a virtual processor, the virtual processor only has a limited amount of time for which it may execute instructions. Thus, if a virtual processor is waiting on an I/O thread, it may go into a halt state during its allotted execution time. Furthermore, the scheduler may schedule execution of the I/O thread separately from the allotted time for the corresponding virtual processor. And, the I/O thread may have lower priority on a process queue than other tasks related to the host or to other virtual machines. Thus, there is a chance that the I/O thread will not complete during the allotted processing time for the corresponding virtual processor or virtual machine.

According to principles described herein, an I/O thread is accelerated on the priority queue in response to detecting that a virtual processor is waiting on execution of that I/O thread. For example, the virtual processor can lend some of its allotted processing time for execution of the I/O thread. This may be done by creating a map between I/O threads and the virtual processors associated with those I/O threads. Through use of principles described herein, a host system can execute instructions associated with the virtual machines it hosts more efficiently.

FIG. 1 is a diagram showing an illustrative system 100 involving a plurality of virtual machines 110. According to the present example, a physical system, such as a host machine 102 includes hardware such as a set of processors 104 and a memory 105. The host machine 102 also includes a scheduler 103. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run a different operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 106 or for use by the virtual machines 110. Such designated blocks of memory are referred to as hypervisor memory 107. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The scheduler 103 is used to manage the execution of multiple tasks on the processor 104. There are several types of tasks that are to be executed by the processor. Some processing tasks are related to the host machine itself. For example, the operating system of the host system may involve several processes that are to be executed by the physical processor 104. Additionally, there are processing tasks associated with the hypervisor 106, including I/O threads associated with various virtual machines 110. Such I/O threads deliver interrupt signals to the virtual processors 108.

The scheduler 103 also allocates processing time for each of the virtual processors 108 associated with the virtual machines 110 being hosted by the host machine 102. During a virtual processor's allotted time, the hypervisor will let the physical processor execute instructions for that virtual processor. Once a virtual processor executes a halt instruction and enters an idle state, it is not selected for execution by the scheduler until the virtual processor receives an interrupt signal.

Figure 2:
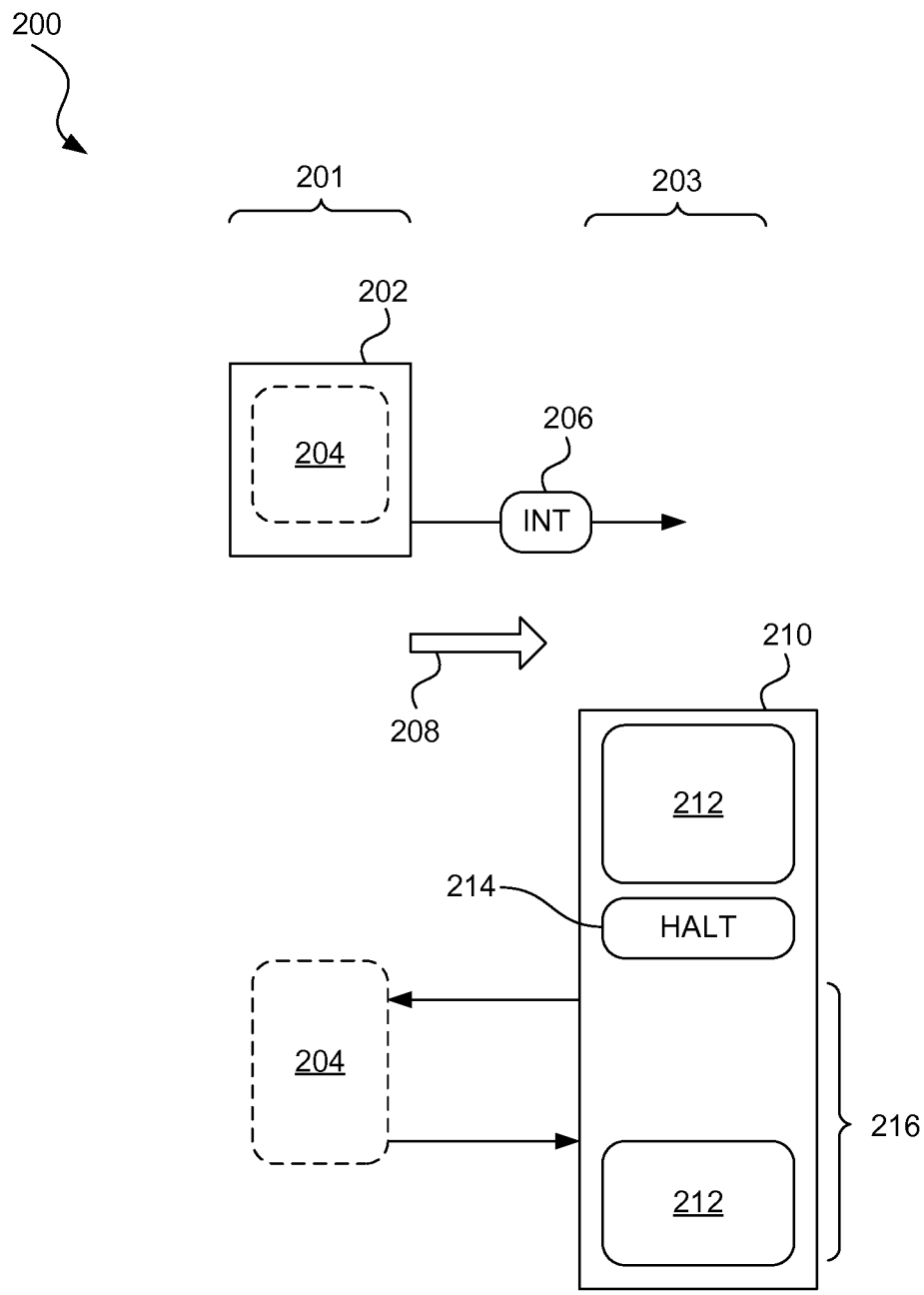
FIG. 2 is diagram showing a process for lending execution time allocated to a virtual processor to an I/O thread, according to one example of principles described herein.

FIG. 2 is diagram showing a process 200 for lending execution time allocated to a virtual processor to an I/O thread. According to the present example, a scheduler allocates a period of time 202 for execution of a portion of an I/O thread 204. The physical processor may be in either the context 201 of another host task or within the context 203 of a virtual processor.

During execution of the I/O thread 204, an interrupt signal 206 is sent to the virtual processor (e.g. 110, FIG. 1) associated with the I/O thread 204. Interrupt signals are used by both physical and virtual devices to notify the processor that a particular event has occurred. In one example, an interrupt signal notifies the processor that data from a device is available for access by the processor. In another example, an interrupt signal notifies the processor that data from the virtual machine has been consumed by the hypervisor and the corresponding system memory can be reused. A particular I/O thread may send multiple interrupt signals to multiple processors.

As will be described in further detail below, a hypervisor (e.g. 106, FIG. 1) can monitor the interrupt signals 206 that are sent to a particular virtual processor. The hypervisor can then associate the thread that sent the interrupt signal with the virtual processor to which the interrupt signal was sent. For example, the hypervisor may maintain a data structure that matches the thread identifier of the thread that sent the interrupt signal with the virtual processor to which the interrupt signal was sent. In the present example, the hypervisor detects that the I/O thread 204 has sent the interrupt signal 206 to a particular virtual processor. The hypervisor then associates the I/O thread 204 with the particular virtual processor.

According to the present example, when the time 202 allotted to the I/O thread 204 passes, the physical processor (e.g. 104, FIG. 1) performs a context switch 208. Because the physical processor of a host machine manages multiple processes and threads, including processes and threads associated with the hypervisor (e.g. 106, FIG. 1) and virtual processors (e.g. 108, FIG. 1), the physical processor regularly switches between the threads. Such a switch between threads is referred to as a context switch. A context switch includes storing the state of the thread so that it can be resumed at a later time. Then, either a new thread starts or a previously started thread resumes. Thus, a new state must be loaded. The state that is saved or loaded may include values stored in processor registers, stack frames, and other data that is relevant to a particular thread.

In this example, the context switch 208 causes the physical processor to start execute instructions for a virtual processor. The virtual processor is allotted a specific period of time 210. During this allotted time, the virtual processor starts processing tasks 212. The virtual processor then executes a halt command 214. But, there is remaining time 216 of the allotted time 210 that is allotted to the virtual processor. Because the virtual processor is now in a halt state as a result of the halt command 214, the remaining time would be donated by the virtual processor to other host tasks or virtual machines. Furthermore, in some cases, the virtual processor enters a halt state because it is awaiting an interrupt signal from the I/O thread. But, it may be the case that the I/O thread is further down on the process queue for the physical processor. Thus, there is a chance that the I/O thread will be delayed, even though it could have completed within the remaining time 216. Thus, using conventional techniques, the remaining time 216 cannot be used to progress with the execution of the virtual machine.

According to one example of principles described herein, the virtual processor lends some of its execution time to the I/O thread. Specifically, during the time 210 allotted for the virtual processor, the physical processor switches to the context 201 of the I/O thread 204 and begins to process the I/O thread 204. In some examples, if the I/O thread 204 completes before the remaining time 216 passes, the physical processor can switch back to the context 203 of the virtual processor. More tasks 212 can then be executed by the virtual processor before the allotted time 210 passes and the physical processor switches to a different context.

In some examples, the I/O thread may not complete during the remaining time 216 allotted to the virtual processor. When the remaining time 216 passes, the processor will then switch to the context of whatever the scheduler has scheduled on the processing queue. Nevertheless, the remaining time 216 is utilized more efficiently. Thus the overall efficiency and performance of a host machine (e.g. 102) can be increased.

Figure 3:
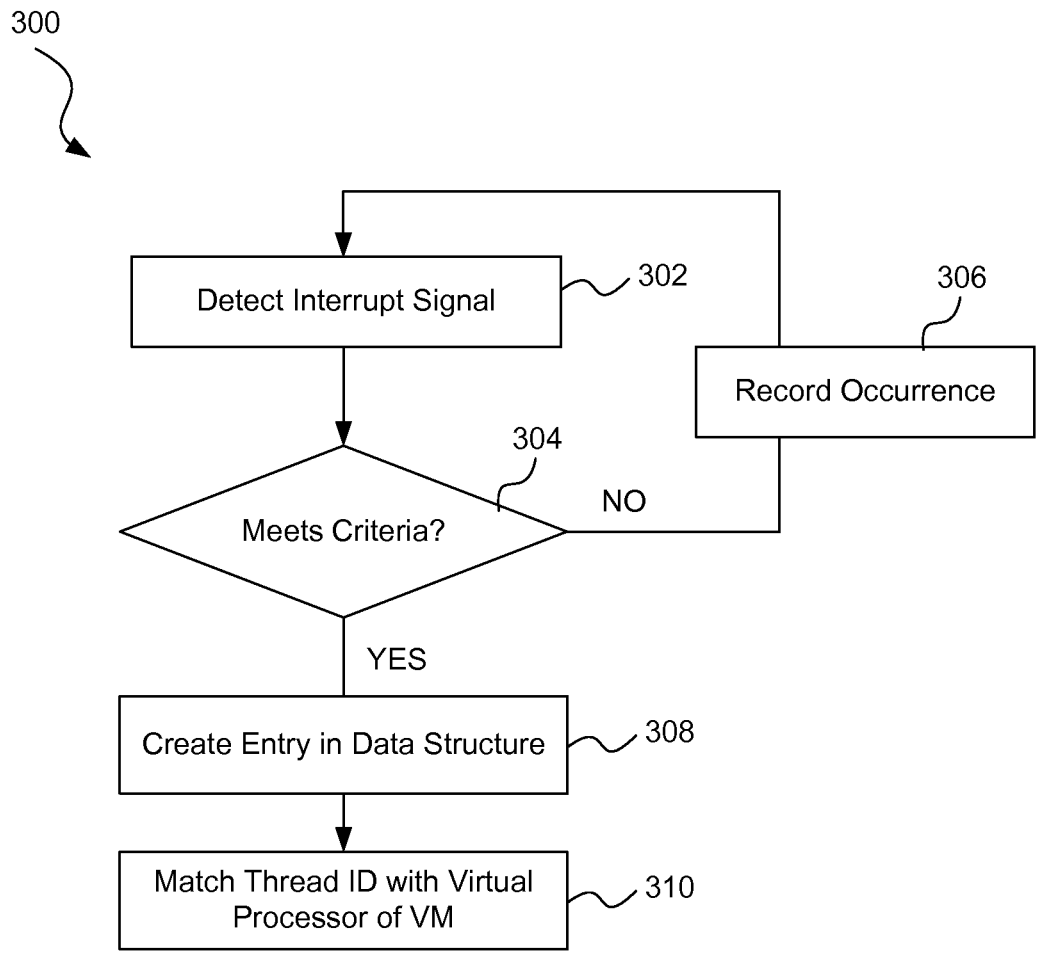
FIG. 3 is a flowchart showing an illustrative method for mapping I/O threads to corresponding virtual processors, according to one example of principles described herein.

FIG. 3 is a flowchart showing an illustrative method for mapping I/O threads to corresponding virtual processors. According to the present example, the method 300 includes a step 302 for detecting an interrupt signal sent from an I/O thread to a virtual processor. A hypervisor generally handles all interrupt signals sent to a virtual processor. For example, the hypervisor may hold onto interrupt signals received while the physical processor is not within the context of the virtual processor, and the virtual processor out of the idle state if the virtual processor had executed a halt instruction. When the physical processor enters the context of the virtual processor, the hypervisor can then pass the interrupt signals to the virtual processor.

The method 300 further includes a step 304 for determining whether the detected interrupt signal meets predefined criteria for associating the I/O thread that sent the signal with the virtual processor to which the interrupt signal is being sent. In one example, the criteria may simply be that the interrupt signal is being sent from the I/O thread to the virtual processor. In some cases, the I/O thread has to send a threshold number of interrupt signals to a particular virtual processor in order for that I/O thread to be associated with that particular virtual processor. In one example, the amount of time passed since the I/O thread last sent an interrupt signal to a particular virtual processor is to be below a threshold amount of time before the hypervisor will associate that I/O thread with the virtual processor to which the interrupt signals are being sent.

If the interrupt signal does not meet the criteria, then the method proceeds to step 306 at which the occurrence of the interrupt signal is recorded. The recorded occurrences of previous interrupt signals sent from an I/O thread to a virtual processor can be used to determine whether subsequent I/O threads cause the total number of interrupt signals meet the criteria and thus trigger an association between the I/O thread that sent the signals and the virtual processor to which the interrupt signals are sent. The method 300 then returns to step 302.

If, however, the criteria are met, then the method proceeds to step 308, at which an entry in a data structure is created for the I/O thread that sent the interrupt signal. The data structure may be, for example, a table of values. The data structure acts as a mapping between I/O threads and virtual processors associated with those I/O threads.

The method 300 further includes a step 310 for matching thread identifiers with their associated virtual processors within the entry created for the association. Threads utilize thread identifiers which allow a scheduler to distinguish between different threads. These thread identifiers can be used to map the I/O threads to the virtual processors to which interrupt signals are being sent.

Figure 4:
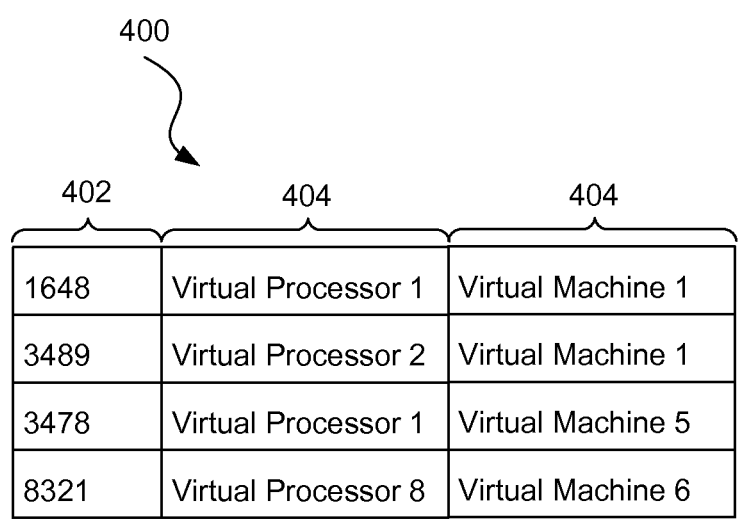
FIG. 4 is a diagram showing an illustrative mapping of I/O threads to corresponding virtual processors, according to one example of principles described herein.

FIG. 4 is a diagram showing an illustrative mapping of I/O threads to corresponding virtual processors. According to the present example, the mapping is in the form of a table 400. The table 400 includes a first column 402 representing thread identifiers. The table 400 also includes a second column 404 representing virtual processors and a third column 408 representing the virtual machine of the corresponding virtual processor. The table 400 can be stored in hypervisor memory (e.g. 107, FIG. 1).

In this example, thread identifier 1648 is associated with virtual processor 1 of virtual machine 1. This means that the hypervisor detected a criteria matching interrupt signal sent from the I/O thread with identifier 1648 to virtual processor 1 of virtual machine 1. Similarly, thread identifier 3489 is associated with virtual processor 2 of virtual machine 1, thread identifier 3478 is associated with virtual processor 1 of virtual machine 5, and thread identifier 8321 is associated with virtual processor 8 of virtual machine 6. While the mapping is illustrated as a table 400, it is understood that other data structures may be used to associated I/O threads with virtual processors.

Figure 5:
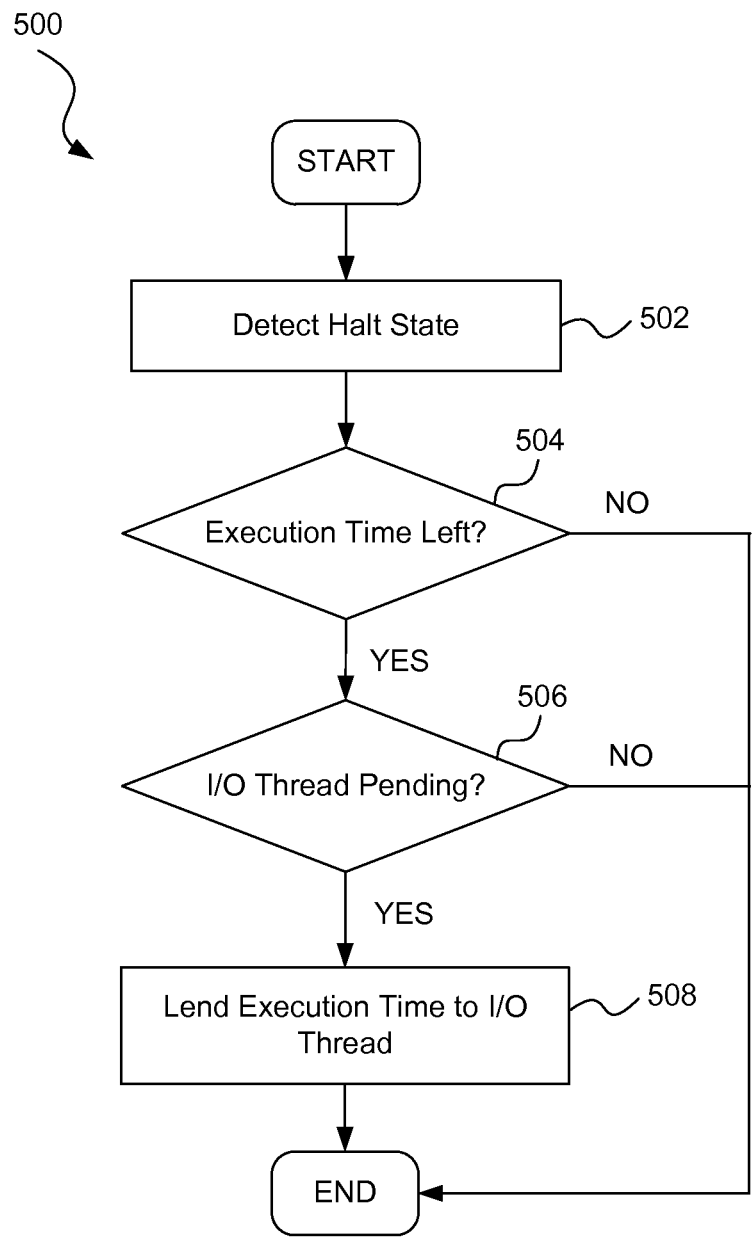
FIG. 5 is a flowchart showing a method for lending execution time allocated to a virtual processor to an I/O thread, according to one example of principles described herein.

FIG. 5 is a flowchart showing a method for lending execution time allocated to a virtual processor to an I/O thread. According to the present example, the method 500 includes a step 502 for detecting that a virtual processor of a virtual machine has entered a halt state. In one example, the hypervisor detects the halt state. As described above, the virtual processor may be in a halt state for a variety of reasons. For example, the virtual processor may be awaiting completion of a particular I/O thread.

The method includes a step 504 for determining whether there is any execution time remaining out of the execution time that was allotted to the virtual processor by the scheduler. If there is no remaining time, then the method ends. But, if there is remaining execution time available, then the method 500 proceeds to the next step.

The method 500 includes a step 506 for determining whether there is an I/O thread pending execution and whether the virtual processor could be waiting on completion of that I/O thread. This may be done by using the mapping between I/O threads and virtual processors. Specifically, the hypervisor can look up a particular virtual processor and see if there are any pending I/O threads associated with that virtual processor. If not, then the method 500 ends. But, if there are any pending I/O threads, then the method proceeds to the next step.

The method 500 further includes a step 508 for lending execution time allotted to the virtual processor to execution of the I/O thread. This effectively moves the I/O thread up on the processing queue. By accelerating the execution of the I/O thread, the virtual processor can exit the halt state sooner. Thus, the host system and virtual machines being hosted by the host system can operate more efficiently.

Figure 6:
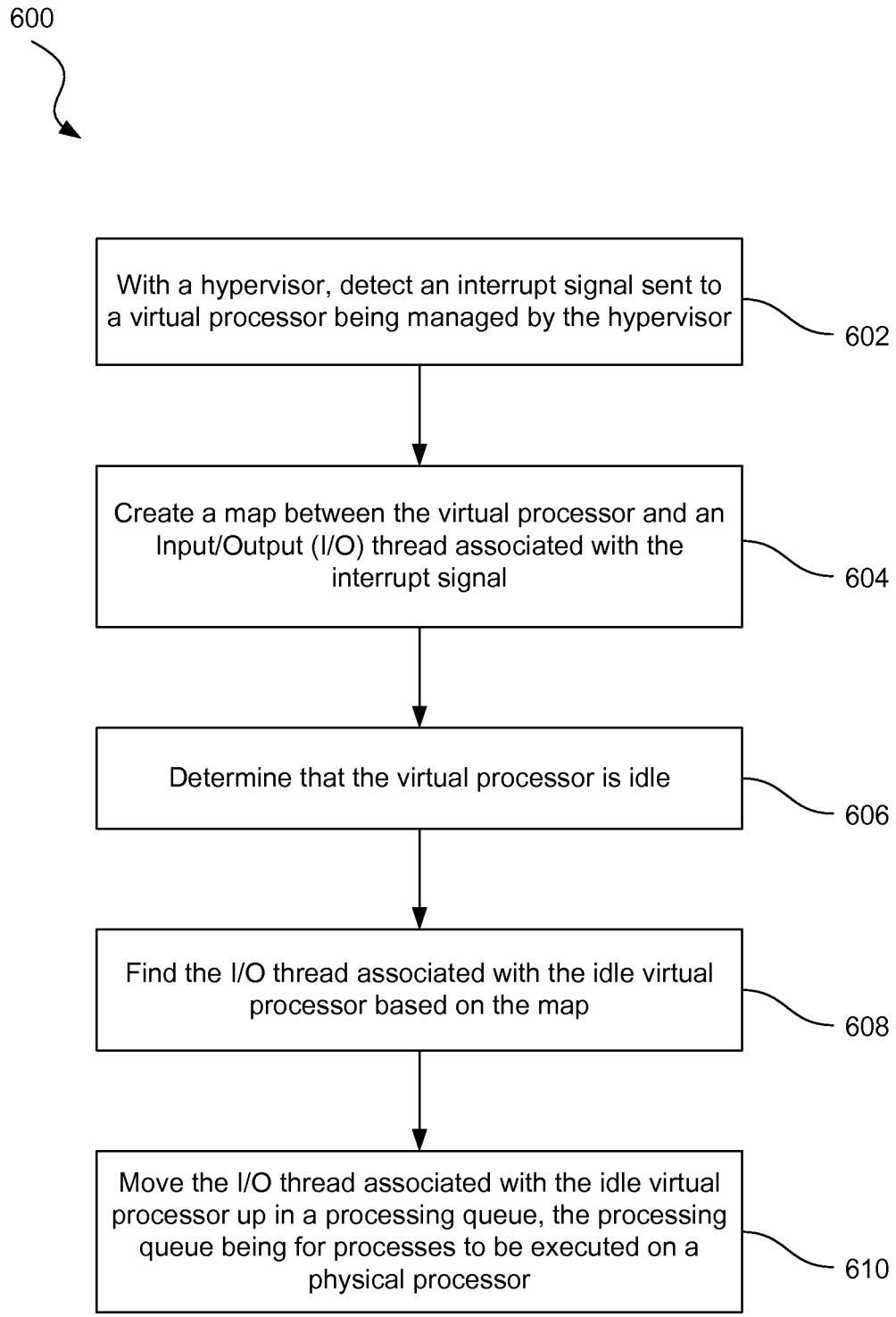
FIG. 6 is a flowchart showing an illustrative method for I/O thread management, according to one example of principles described herein.

FIG. 6 is a flowchart showing an illustrative method for I/O thread management. According to the present example, the method 600 includes a step 602 for, with a hypervisor, detecting an interrupt signal sent to a virtual processor being managed by the hypervisor. The method 600 further includes a step 604 for creating a map between the virtual processor and an I/O thread associated with the interrupt signal. Specifically, if an I/O thread sends an interrupt signal to a virtual processor, or a threshold number of interrupt signals, then a mapping, or association, between that I/O thread and that virtual processor can be made.

The method 600 further includes a step 606 for determining that the virtual processor is idle. This may be because the virtual processor has executed a halt command. The virtual processor may be idle because it is waiting on an interrupt. In one example, completion of an I/O thread causes an interrupt signal to be sent to the virtual processor.

The method 600 further includes a step 608 for finding the I/O thread associated with the idle virtual processor based on the map. This may be done by looking up the appropriate entry in the data structure used for the map.

The method 600 further includes a step 610 for moving the I/O thread associated with the idle virtual processor up in a processing queue for processes to be executed on a physical processor. In one example, this is done by having the virtual processor lend some of its allotted execution time to execution of the I/O thread. In one example, the scheduler moves the I/O thread up on the processing queue.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   with a hypervisor, detecting an interrupt signal sent to a virtual processor being managed by the hypervisor;
   creating a map between the virtual processor and an Input/Output (I/O) thread associated with the interrupt signal; and
   in response to determining that the virtual processor is idle;
      finding the I/O thread associated with the idle virtual processor based on the map; and moving the I/O thread associated with the idle virtual processor up in a processing queue, the processing queue being for processes to be executed on a physical processor.

2. The method of claim 1, wherein the map comprises a data structure that matches I/O threads with corresponding virtual processors.

3. The method of claim 1, wherein an association within the map is made between the virtual processor and the I/O thread if the I/O thread sends a threshold number of interrupt signals to the virtual processor.

4. The method of claim 1, further comprising, storing the map in hypervisor memory.

5. The method of claim 1, wherein the map associates the I/O thread with the virtual processor and a virtual machine corresponding to the virtual processor.

6. The method of claim 1, wherein the virtual processor is idle because the virtual processor executed a halt command.

7. The method of claim 1, wherein the moving the I/O thread associated with the idle virtual processor up in a processing queue comprises lending execution time from the virtual processor to the I/O thread.

8. The method of claim 1, wherein the map includes associations of multiple I/O threads to multiple additional virtual processors.

9. The method of claim 1, wherein the map uses a thread identifier of the I/O thread to map the I/O thread to the virtual processor.

10. A computing system comprising:
a processor; and
a memory comprising computer readable instructions that when executed by the processor, cause the system to:
run a hypervisor to host a virtual machine that includes a number of virtual processors;
run a scheduler to manage a processing queue for execution of threads on the processor;
detect an interrupt signal sent to one of the virtual processors;
create a map between an Input/Output (I/O) thread associated with the interrupt signal and the one of the virtual processors; and
determine that the virtual processor is in an idle state, and in response;
use the map to find the I/O thread associated with the virtual processor in the idle state; and
cause the scheduler to move the I/O thread up in the processing queue.

11. The system of claim 10, wherein to create the map, the processor is further to cause the system to create an entry in a data structure, the entry associating the I/O thread with the one of the virtual processors.

12. The system of claim 11, wherein the entry in the data structure includes a thread identifier for the I/O thread.

13. The system of claim 11, wherein the entry is created in response to detecting a threshold number of interrupt signals from the I/O thread to the one of the virtual processors.

14. The system of claim 10, wherein the processor is further to cause the system to store the map in a hypervisor memory.

15. The system of claim 10, wherein the map associates the I/O thread with the virtual processor and a virtual machine corresponding to the virtual processor.

16. The system of claim 10, wherein to cause the scheduler to move the I/O thread up in the processing queue, the processor is further to cause the system to lend execution time allocated to the one of the virtual processors to the I/O thread.

17. The system of claim 10, wherein the processor is further to cause the system to:
detect interrupt signals from other I/O threads sent to other virtual processors of the number of virtual processors being executed on the computing system; and
map the other I/O threads to the other virtual processors.

18. A method performed by a physical computing system, the method comprising:
with a hypervisor, monitoring interrupt signals sent to virtual processors;
creating a map between Input/Output (I/O) threads associated with the interrupt signals and the virtual processors;
with a scheduler, managing a processing queue for a set of threads to be executed on a host processor, the set of threads including the I/O threads; and
in response to determining that a first virtual processor of the virtual processors is in an idle state;
using the map to find the I/O thread associated with the first virtual processor; and
causing the scheduler to use execution time allocated to the first virtual processor for execution of the I/O thread associated with the first virtual processor.

19. The method of claim 18, wherein the first virtual processor is idle because the virtual processor executed a halt command.

20. The method of claim 18, wherein creating the map comprises, for each detected interrupt signal, create an entry in a data structure that links the I/O thread that sent that interrupt signal to the virtual processor to which that interrupt signal is being sent.

* * * * *